US010488229B2

(12) United States Patent
Bastianini

(10) Patent No.: US 10,488,229 B2
(45) Date of Patent: Nov. 26, 2019

(54) DOUBLE FREQUENCY CONVERSION APPARATUS FOR SOURCING RADIATIONS HAVING AN INTRINSICALLY STABLE WAVELENGTH-SHIFT THAT IS QUICKLY TUNEABLE WITHIN AN EXTENDED RANGE, IN PARTICULAR FOR USE IN BRILLOUIN ANALYSERS

(71) Applicant: Filippo Bastianini, Bologna (IT)

(72) Inventor: Filippo Bastianini, Bologna (IT)

(*) Notice: Subject to any disclaimer, the term of this patent is extended or adjusted under 35 U.S.C. 154(b) by 67 days.

(21) Appl. No.: 15/557,868

(22) PCT Filed: Apr. 19, 2016

(86) PCT No.: PCT/IT2016/000096
§ 371 (c)(1),
(2) Date: Sep. 13, 2017

(87) PCT Pub. No.: WO2016/178255
PCT Pub. Date: Nov. 10, 2016

(65) Prior Publication Data
US 2018/0073900 A1    Mar. 15, 2018

(30) Foreign Application Priority Data
May 5, 2015    (IT) .............................. BO2015A0234

(51) Int. Cl.
  *G01K 11/00*  (2006.01)
  *G01K 1/00*  (2006.01)
  (Continued)

(52) U.S. Cl.
  CPC ......... *G01D 5/35364* (2013.01); *G01K 11/32* (2013.01); *H01S 3/04* (2013.01);
  (Continued)

(58) Field of Classification Search
  USPC .................................................. 374/161, 120
  See application file for complete search history.

(56) References Cited

U.S. PATENT DOCUMENTS

| 7,283,216 B1 | 10/2007 | Geng et al. | |
| 2015/0377656 A1* | 12/2015 | Bastianini | .......... G01D 5/35364 356/301 |
| 2017/0108358 A1* | 4/2017 | Bastianini | .......... G01D 5/35303 |

FOREIGN PATENT DOCUMENTS

GB    2289331 A1    11/1995

* cited by examiner

Primary Examiner — Mirellys Jagan
(74) Attorney, Agent, or Firm — Luoh J. Wu; Continent Patent Office LLP

(57) ABSTRACT

Apparatus for producing and sourcing two lightwaves having a wavelength-shift known and controllable and suitable to be used as "pump" and "probe" in a stimulated Brillouin analyser in which part of the radiation of frequency $f_o$ from a primary source (70) is first shifted of a frequency $\Delta f_1$ typically from 200 to 1000 MHz lower than the Brillouin shift $\Delta f_{B,SNS}$ in the sensor, by a first frequency conversion system comprising a Brillouin ring laser (105) and then is shifted of a frequency $\Delta f_2$ in order to fall inside the Brillouin gain band of the sensor through a further tuneable frequency conversion system (105, 106, 107) in which at least one electro-optical modulator generates modulation side bands (117, 119) of frequency $(f_o-\Delta f_1+\Delta f_2)$ and $(f_o<\Delta f_1-\Delta f_2)$, only one of which can fall within a Brillouin gain band of the sensor. The apparatus possibly comprises also a feedback stabilization system that acts on $\Delta f_2$ depending on changes in the value of $\Delta f_1$ in order to stabilise at least one between $|\Delta f_1+\Delta f_2|$ and $|\Delta f_1-\Delta f_2|$. The apparatus solves the following problems of known solutions: wavelength-shift stability and (Continued)

accuracy, wavelength agility, width of the wavelength-shift tuning range, power consumption, tuning speed and industrial cost.

8 Claims, 4 Drawing Sheets

(51) Int. Cl.
    *G01D 5/353*     (2006.01)
    *H01S 3/30*     (2006.01)
    *G01K 11/32*     (2006.01)
    *H01S 3/04*     (2006.01)
    *H01S 3/067*     (2006.01)
    *H01S 3/13*     (2006.01)
(52) U.S. Cl.
    CPC ........ *H01S 3/06791* (2013.01); *H01S 3/1305* (2013.01); *H01S 3/302* (2013.01); *G01K 2011/322* (2013.01)

DOUBLE FREQUENCY CONVERSION APPARATUS FOR SOURCING RADIATIONS HAVING AN INTRINSICALLY STABLE WAVELENGTH-SHIFT THAT IS QUICKLY TUNEABLE WITHIN AN EXTENDED RANGE, IN PARTICULAR FOR USE IN BRILLOUIN ANALYSERS

TECHNICAL FIELD OF THE INVENTION

The Brillouin effect in a physical medium is an interaction between photons and mechanical vibrations in which some photons are scattered with a wavelength shift depending on temperature and strain of the medium.

Different types of Brillouin analysers are known to measure the distribution of the stimulated Brillouin wavelength-shift along the position in an optical fibre sensor:
A1) BOTDA Brillouin Optical Time-Domain Analyser (WO2012156978A1, EP0348235, JP2010008400A);
A2) BOCDA Brillouin Optical Coherence Domain Analyser (US2009141267A1, K. Hotate and T. Hasegawa, IEICE Trans. Electron., E83-C, 3 (2000);
A3) I-BOFDA Incoherent Brillouin Optical Frequency-Domain Analyser (EP2110646A2);
A4) C-BOFDR, Coherent Brillouin Optical Frequency-Domain Reflectometer (PCT/IT2015/000114);
Stimulated Brillouin analysers require two lightwaves ("pump" and "probe") that must have:
   spectral linewidth smaller than the width $GBW_{B,SNS}$ of the Brillouin Gain Band ($BGB_{SNS}$) of the sensor fibre ($GBW_{B,SNS}$~25 MHz for a Corning SMF-28 fibre), at least for the "pump";
   relative frequency-shift ($\Delta f$) stable, known and arbitrarily controllable around the Brillouin $\Delta f_{B,SNS}$ shift at which the $BGB_{SNS}$ is centred ($\Delta f_{B,SNS}$~10.85 GHz for a Corning SMF-28 fibre), widely enough to cover the desired measurement range considering the temperature (~1.2 MHz/° C.) and strain (~500 MHz/%) dependence of $\Delta f_{B,SNS}$.

It is known the use of the following types of lightwave sources for stimulated Brillouin analyser:
B1) O-SBM (Optical Side Band Modulation) according to the scheme in the frame 1 of FIG. 1 (WO2012084040A1, Kasinatan M. et al., ICOP 2009 and others) in which part of the radiation form a primary source (4) is picked up by a coupler (5), modulated at ~10.84 GHz by an optical intensity modulator to create two symmetrically shifted sidebands (15, 17) and then filtered (7) to suppress the undesired sideband (20) thus obtaining a single frequency conversion directly inside the $BGB_{SNS}$. Such O-SBM modulation principle has also variants using Single Side Band (SSB) modulators such as Acousto-Optical Modulators (AOM) or "tandem" nested modulators (US2009141267A1, JP2015021748A).
B2) O-PLL (Optical Phase-Locked Loop) between two separate laser sources to stabilise their frequency shift directly at a value (~10.84 GHz) inside the $BGB_{SNS}$ according to the scheme in the frame 2 of FIG. 1 (US2008018903A1, Garus D. et al., J. of Lightwave Techn. 15(4), 1997) in which the beat signal (32) between the light picked-up (31, 35) from primary (30) and secondary (36) lasers is used as a feedback (33) for locking the frequency shift between the two sources by fine tuning the wavelength of the slave laser (36);
B3) T-BRL (Tuneable Brillouin Ring Laser) according to the scheme in the frame 3 of FIG. 1 (WO2014155400A3) in which a secondary radiation is frequency shifted directly of value (~10.84 GHz) inside the $BGB_{SNS}$ by means of a stimulated tuneable Brillouin ring laser (51-57) that is excited by the primary source (50) and has a shift that is tuned inside the $BGB_{SNS}$ by controlling the temperature and strain of the Brillouin Gain Medium (BGM) in the laser ring (53).

Other systems for light frequency conversion are also known for telecommunication purposes and out of the scope of Brillouin analysis but relevant for the prior art of the present invention:
B4) USH1791H discloses a device in which a radiation is first modulated and then injected in a "forward" Brillouin ring resonator or "forward" Brillouin non-ring converter having a Brillouin shift similar to the modulation frequency in order to enhance the carrier suppression;
B5) US20010030796A1 discloses a variant of B4) using multiple different sources and modulators in which a radiation is first modulated and then injected in a "forward" Brillouin amplifier to enhance a single modulation sideband, and P. H. Hsieh et al. "Optical SSB using feedback based on SBS . . . ", Progress in E. M. Research Symp., Suzhou, China. 2011 discloses another variant in which a non-ring Brillouin amplifier is pumped by a separately amplified fraction of the non-modulated primary radiation.
B6) US2012060615A1 discloses a Distributed Acoustic Sensor (DAS) application in which a radiation is first sourced then generically filtered to selected the wanted sideband;
B7) Kawanishi T. et al, IEEE Photonics Techn. Letters, 13(8), 2001 pp. 854-856 disclose a frequency conversion system using multiple passages through a "tandem" electro-optical modulator;
B8) Shimotsu S. et al. "LiNbO3 optical single-sideband modulator" OFC, 2000, PD-16, discloses the use of nested "tandem" modulators to obtain a frequency conversion through a single-side band optical modulation.

In the prior art lightwave frequency conversion is used to produce a probe lightwave frequency-shifted of a quantity $v_B = \Delta f_{B,SNS}$ inside the $BGB_{SNS}$ with a single direct frequency conversion, while further modulators eventually present have only the scope of achieving additional functionalities.

In US20090141267A1 a O-SSB modulator (US20090141267A1 FIG. 1 element 8, [0088]) is used to achieve a shift $\Delta v = v_B$ equal to the Brillouin shift of the sensor, that is inside the $BGB_{SNS}$, with a direct and single frequency conversion, while the other modulators (US20090141267A1 FIG. 1 elements 6, 13) act exclusively as choppers for a "lock-in" optical correlation detection scheme that is the specific scope of that patent.

In JP2015021748A (prior an described in FIG. 1 frame 330) an electro-optical frequency converter (308, JP2015021748A FIG. 1 element 13, [0043]) shifts the spectrum line $f_2$ (301) of the master laser (300) of a quantity $v_B$ equal to the Brillouin shift of the sensor (JP2015021748A [0034]) producing a spectrum line $f_1$ (315) with a direct and single conversion inside the $BGB_{SNS}$ (319), and the further modulators (302, 309), that are described exclusively as electro-optical (JP2015021748A [0024], (0043)), have the scope of generating multiple copies of both the pump (316) and probe signals (317) shifted so that Brillouin interaction happens between many pairs of pump/probe lightwaves of frequencies $f_{11}/f_{21}$, $f_{12}/f_{22}$, $f_{13}/f_{23}$, $f_{14}/f_{24}$, . . . each of them having the probe located at a slightly different point of the respective $BGB_{SNS}$ (319, 320, 321, 322) assumed invariant, with the final scope of simultaneously measuring the gain at multiple points of the $BGB_{SNS}$.

In both US20090141267A1 and JP2015021748A Brillouin ring laser is not used and in JP2015021748A the further frequency conversion does not have the scope of tuning the probe lightwave inside the $BGB_{SNS}$ since this is already obtained by the first conversion, and cannot stabilise the tuning or extend the tunability range.

In WO2014155400A (prior an described in FIG. 1 frame 3) a single Brillouin ring laser is used to produce a probe lightwave frequency-shifted of a quantity $v_B = \Delta f_{B,SNS}$ with a direct and single conversion inside the $BGB_{SNS}$, and further electro-optical intensity modulators are used only with the scope of generating a pulsed light propagation in the sensing fibre, while the possibility of using neither a further frequency conversion stage nor a side band modulator to stabilize the shift of the Brillouin laser or to expand its tuning range are cited.

WO2015170355A1 discloses a coherent interferometer to resolve the distance distribution of the Brillouin shift where a single Brillouin ring laser is used to shift the frequency of the probe lightwave with a direct and single conversion inside the $BGB_{SNS}$ (WO2015170355A1 pag. 6, line 19 and pag. 8 lines 2-4) and includes means to change the length of the ring laser cavity in order to optimize its efficiency during the wavelength-sweeping process, however due to the specific ring embodiment described in WO2015170355A1, the control of cavity length can not produce optical sideband modulation because:

the ring laser in WO2015170355A1 includes circulators (WO2015170355A1 FIG. 2, 6 elements 15, 18) that allows the recirculation of the Brillouin stokes lightwave only preventing the recirculation of the pump; this implies necessarily that a resonant increment of the pump intensity is not allowed (Stokes L F., Chodorow M. and Shaw J. H., "All single mode fiber resonator", Optics Letters, Vol. 7 No. 6, 1982); this implies necessarily that the length of the BGM in the ring cavity must be extremely (>km) long to obtain reasonably low threshold power (<50 mW) and efficient conversion (>50%) of the pump into the stokes lightwave (Stokes L. F., Chodorow M. and Shaw J. H., "All-fiber stimulated Brillouin ring laser with submilliwatt pump threshold", Optics Letters, Vol. 7 No. 10, 1982); this implies necessarily that with such huge cavity length (Bowers J. E. et al., "Filter response of single mode fibre recirculating delay lines", Electron. Lett., 18, 110, 1982) the free spectral range FSR ($FSR = c/[n_g \cdot L_C]$, where c is the speed of the light, $n_g$ the group index and $L_C$ the length of the cavity) is necessarily smaller than the laser linewidth so the ring laser embodiments disclosed by WO2015170355A1 may allow only extremely weak (>5-10%) modulation of the output intensity, too weak to effectively produce lightwave frequency conversion by sideband modulation (Frenzel L., "Principles of Electronic Communication Systems", pag. 107); this implies necessarily that the ring laser embodiments disclosed by WO2015170355A1 does not disclose and can not even suggest that the modulation of the length of the ring laser cavity can be used to produce a further lightwave frequency conversion by optical sideband modulation.

Limitation of Known Solutions and Technical Problems Still to be Solved

The "O-SBM" systems according to B1) are characterized by:

very high industrial cast due to the use of microwave (>10 GHz) modulators and drive electronics;

critical narrowband optical filtering to suppress one of the closely-spaced (~20 GHz) sidebands otherwise, due to their symmetry, one of them would result amplified by Stokes Brillouin scattering while the other attenuated by anti-Stokes Brillouin scattering thus confusing the intensity information to be measured;

no wavelength agility (capability of changing the wavelength of the primary source keeping at the same time the wanted frequency shift between) due to the narrowband optical filtering (or tandem modulator biasing).

The "O-PLL" systems according to B2) are characterized by:

very high industrial cost due to narrow linewidth primary laser (i.e. ~2 kHz expensive fixed wavelength laser);

intrinsic instability, with unreliable and time-consuming alignment of the PLL circuitry;

no wavelength agility, due to both the primary laser and the PLL stability.

The "T-BRL" systems according to B3) are characterized by:

limitation of tuning range for the wavelength-shift (typically within −30 MHz and +150 MHz corresponding to a measurement range of −25÷+125° C. or −0.05÷+0.3%) due to the temperature and strain limits that can be applied to the laser BGM in practice and repetitively without damaging it;

high energy consumption due to the thermal/strain tuning system;

slow tuning speed due to the thermal inertia of the BGM and its support elements;

limitation of the tuning stability imposed by the thermal and strain stability of the ring laser.

The systems disclosed by the points B4), B5) and B6) are characterized by the use of a low-efficiency "forward" Brillouin amplification and by the fact that the signal is modulated before being injected in the Brillouin "reaction" element and this requires that the modulation frequency must be tuned to the Brillouin shift frequency, therefore they do not allow to arbitrarily control the frequency shift such as it is required for a Brillouin analyser.

The systems disclosed at the points B7) e B8) require an extremely expensive "tandem" modulator that is also difficult to have at the high-speed needed (>10 GHz) for a Brillouin analyser.

SCOPES OF THE INVENTION

The present invention is capable to produce at least two radiation suitable to be used in a Brillouin analyser and overcoming all the limitations listed for the known solutions, and it is in particular characterized by:

improved stability and/OR reduced uncertainty of the frequency shift, and wide wavelength agility, and extended tuning range for the frequency shift (points from B3 to B6), and low energy consumption, and high tuning speed, and low industrial cost of the components and manufacturing.

DISCLOSURE OF THE INVENTION

The listed scopes are achieved by the present invention since it embodies a double frequency conversion system for generating two radiations having a wavelength-shift the one with respect to the other that is known, controllable and stabilised, in particularly in which:

C1) at least one stimulated Brillouin ring laser or converter generates a first secondary radiation frequency-shifting part of the radiation from a primary laser source of a quantity $\Delta f_1$ that however does not match the Brillouin shift $\Delta f_{B,SNS}$ for the sensing fibre ($\Delta f_{B,SNS} \sim 10.8$ GHz for a SMF-28) and falls outside its Brillouin gain band $BGB_{SNS}$ of at least $2 \cdot GBW_{B,SNS}$ by means of using a Brillouin Gain Medium (BGM) specifically characterized by a Germanium doping and/or acousto-optical coupling different from that of the sensor and so that to inducing a Brillouin shift $\Delta f_1 = f_{B,BGM}$ being $|\Delta f_{B,SNS} - \Delta_{B,BGM}| > N \cdot GBW_{B,SNS}$ with N>2 and typically (not binding) comprised within 7 and 70, and C2) at least one further frequency conversion system generates a further secondary radiation frequency-shifting part of the primary radiation or of the first secondary radiation of a quantity $\Delta f_2$ arbitrarily controllable, so that $|\Delta f_1 + \Delta f_2| \approx \Delta f_{B,SNS}$ that is the said further secondary radiation falls in the Brillouin gain band $BGB_{SNS}$ of the sensor, and in particular preferentially (but not exclusively) such further frequency conversion system comprises at least one electro-optical intensity modulator or other system suitable for generating at least one optical modulation sideband.

C3) at least one feedback stabilization system might be also present capable of picking-up the value of $\Delta f_1$ or $(\Delta f_1 + \Delta f_2)$ or $(\Delta f_1 - \Delta f_2)$, typically by optically heterodyning respectively the primary laser and the first secondary radiation or the primary laser and the further secondary radiations, as an input and capable of acting on $\Delta f_2$ in order to compensate for changes of $\Delta f_1$ i.e. due to temperature drift or strain changes in the Brillouin gain medium, with the final scope of stabilising at least one between the values $(\Delta f_1 + \Delta f_2)$ and $(\Delta f_1 - \Delta f_2)$. Such feedback stabilization could be for example obtained by through an electronic circuit that evaluates the change $d(\Delta f_1)$ of $\Delta f_1$ with respect to a known stable frequency reference and changes $\Delta f_2$ of a quantity $-d(\Delta f_1)$ or $d(\Delta f_1)$ respectively when the sideband of frequency $(f_0 - \Delta f_1 - \Delta f_2)$ or $(f_0 - \Delta f_1 + \Delta f_2)$ is used in the stimulated Brillouin interaction. i.e. through an active feedback that controls the frequency of the signal source that generates $\Delta f_2$ or through a passive feedback that can be for example embodied by producing $\Delta f_2$ through heterodyne of $\Delta f_1$ with at least one electrical oscillator (typically programmable and with high frequency accuracy such as PLL or Direct Digital Synthesiser), or eventually with multiple heterodyne stages. A passive feedback stabiliser for the sideband $(f_0 - \Delta f_1 - \Delta f_2)$ could be for example embodied by heterodyning $\Delta f_1$, the nominal value of which being $\Delta f_{1,0}$, with a stable oscillator at the frequency $f_{osc} = \Delta f_{1,0} + f_{ctrl} > f_{1,0}$ in order to obtain $\Delta f_2$ from the low-pass filtered subtractive sideband $\Delta f_2 = f_{osc} - \Delta f_1 = (\Delta f_{1,0} + f_{ctrl}) - \Delta f_1$: in this way any change $d(\Delta f_1) = \Delta f_1 - \Delta f_{1,0}$ of $\Delta f_1$ from its nominal value $\Delta f_{1,0}$ would produce an opposite change of equal absolute value on $\Delta f_2$ i.e. $\Delta f_2 = (\Delta f_{1,0} + f_{ctrl}) - [\Delta f_{1,0} + d(\Delta f_1)] = f_{ctrl} - d(\Delta f_1)$ so that the total frequency shift of the optical sideband $(f_0 - \Delta f_1 - \Delta f_2)$ is stabilised at the value $(f_0 - \Delta f_{1,0} - f_{ctrl})$.

In the present invention, the novelty element of multiple frequency conversions is combined with the novelty element of having a first frequency conversion step $\Delta f_1$ achieved through a Brillouin ring laser and far from the Brillouin shift $\Delta f_{B,SNS}$ of the sensor fibre and outside its $BGB_{SNS}$ of at least $2 \cdot GBW_{B,SNS}$, that is non-obvious because apparently in contrast with the final desired effect, that is shifting the lightwave inside the $BGB_{SNS}$ or as much close as possible, followed by a second frequency conversion $\Delta f_2$ by means of electro-optical sideband modulation. Such combination is also non-obvious because apparently more expensive than a single conversion but has the effect of making not necessary the suppression of the unused symmetrical modulation sideband when the lightwaves are used for stimulated Brillouin interrogation, eliminating the need of critical optical filtering.

In addition it is introduced a second novelty element of using a special BGM in the ring laser with the effect of obtaining a frequency shift $\Delta f_1 = \Delta_{B,BGM}$ very different from that of the sensor $\Delta f_{B,SNS}$ and in particular $|\Delta f_{B,SNS} - \Delta f_{B,BGM}| > N \cdot GBW_{B,SNS}$ without the need of power-consuming heating/cooling or application of failure-risky strain to the BGM.

It is further introduced a third novelty element of modifying the type of Brillouin laser in a short-cavity ring with recirculation and resonant amplification of both pump and stokes lightwaves, so that to obtain an intensity modulation of the stokes output effective enough to produce the sideband conversion by modulating the length of the ring cavity; with the effect or reducing the cost for implementation.

It is further introduced a fourth novelty element of feedback stabilization system acting on $\Delta f_2$ in order to compensate for changes of $\Delta f_1$ so that to stabilise the frequency shift $(\Delta f_1 \pm \Delta f_2)$ between the lightwaves used in the Brillouin analysis, with the effect of reducing the uncertainty in the measurement of the Brillouin shift, that is increasing the accuracy and resolution on the measurement of the strain, temperature and pressure, and at the same time eliminating the need of power-consuming temperature/strain stabilization of the BGM in the ring. Combination of a sideband modulation followed by Brillouin amplification is known from B4), however this does not prejudices the novelty elements introduced since the inverse configuration (Brillouin ring laser followed by sideband modulation) is not obvious because it cannot achieve the effect sought by prior art from B4) to B7) and are furthermore new and non-obvious:

the use of "backward" Brillouin scattering instead of "forward" Brillouin scattering;

the use of a BGM having Brillouin shift $\Delta f_1$ and modulation frequency $\Delta f_2$ specifically having large difference $\Delta f_1 \neq \Delta f_2$;

the use of multiple frequency conversion with the scope of having only one of the sidebands $(f_0 - \Delta f_1 - \Delta f_2)$ and $(f_0 - \Delta f_1 + \Delta f_2)$ falling within the Brillouin gain band of the sensor, the possibility of acting on the BGM of the converter in order to change $\Delta f_1$ with the scope of extending the frequency-shift tuning range by alternatively using the subtractive sideband $(f_0 - \Delta f_1 - \Delta f_2)$ and the addictive sideband $(f_0 - \Delta f_1 + \Delta f_2)$.

The double frequency conversion that characterizes the present invention has the following technical effects:

D1) the frequency shift between the primary and secondary lightwaves is intrinsically stable versus any drift of the master laser, since the secondary radiations are all produced by frequency shift;

D2) the system is wavelength agile since it does not need filters such as in "O-SBM" of B1) or ultra-stable laser (having output wavelength that is not tuneable in a wide range i.e. >10 nm) as in "O-PLL" of B2). Thanks to the double conversion, one of the modulation sidebands falls in a position far from both the Brillouin Stokes gain band and from the Brillouin anti-Stokes gain band of the sensor, and therefore it is not necessary to suppress this band because it does not take part to the Brillouin interaction that is to be measured;

D3) the frequency-shift tuning range is extended with respect to the "T-BRL" of B3) and in particular is extended at least between $|f_1+\Delta f_{2,min}|$ and $|\Delta f_1+\Delta f_{2,max}|$ in which $\Delta f_{2,min}$ and $\Delta f_{2,max}$ are the minimum and maximum modulation frequencies that can be applied to the second frequency conversion system, and it can be possibly also further extended by changing also $\Delta f_1$ (i.e. by changing the temperature and/or strain of the BGM or the same BGM for example by means of optical switching means);

D4) the energy consumption is reduced with respect to the thermally-tuned "T-BRL" since the fine tuning is now obtained in the second frequency conversion system while the Brillouin converter in the first conversion system can be stabilized at a fixed shift keeping the BGM at a temperature close to that of the environment with low energy consumption, or even leaving the BGM at the thermal equilibrium with the environment and measuring its temperature and/or the effective value of $\Delta f_1$ (even indirectly) to know the total shift between the sourced radiations;

D5) the tuning seed of the frequency shift is increased since the tuning is obtained varying the modulation frequency in the second conversion system, i.e. (not binding) by means of a tuneable electronic oscillator or a programmable Direct Digital Synthesizer (DDS);

D6) the industrial cost is reduced since the second conversion system uses one electro-optical intensity modulator and drive circuit at low frequency (typically 50 MHz<$\Delta f_2$<2 GHz) much cheaper than those required for a >10 GHz microwave modulation. Even cheaper variants are also possible i.e. by modulating the cavity length of the Brillouin ring laser to produce the second stage of frequency conversion.

The present invention can be used to source the "pump" and "probe" (or heterodyne) radiation in any type (including combinations) of "Brillouin analyser" suitable to measure the distribution of Brillouin shift (and/or temperature, and/or strain, and/or pressure) with respect to the position along a sensing optical fibre, such as (not binding) in the interrogation schemes A1), A2), A3) e A4): the protection of this invention is therefore extended to any type of Brillouin analyser or different apparatus that uses or includes this invention.

BRIEF DESCRIPTION OF THE DRAWINGS

The invention will be now described referring to the attached figures that represent preferential (non binding) embodiments and include the best mode for carrying out the invention.

Figure 1:
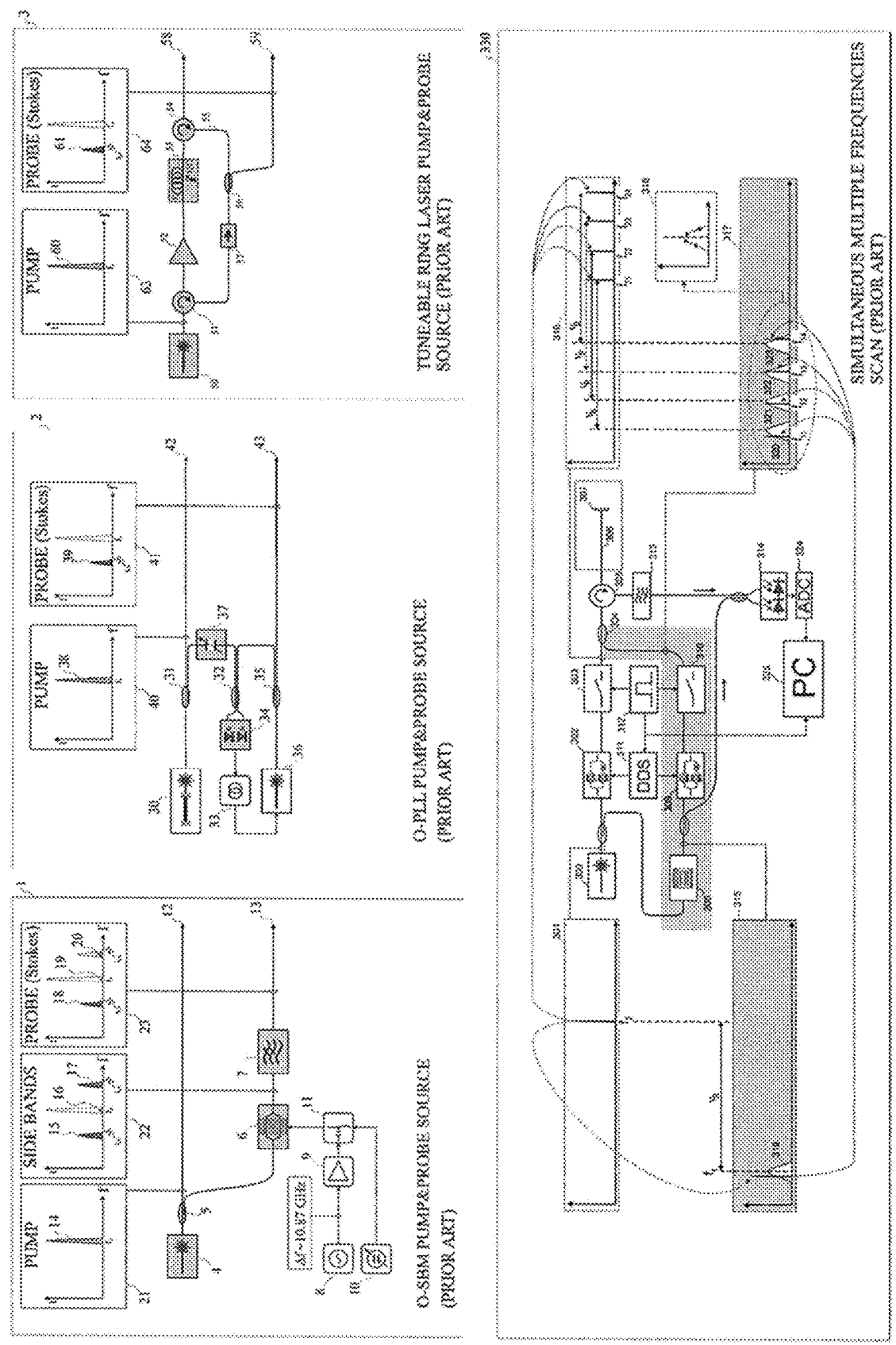
FIG. 1 illustrates some relevant prior art in the technical field of the invention as already detailed in the preceding section "TECHNICAL FIELD OF THE INVENTION".

The spectrum (116) of the modulated radiation in the second output line (113) comprises a residuum of the carrier (118) of frequency ($f_0-\Delta f_1$) that is generated by the Brillouin ring laser (102) and two modulation sidebands (117, 119) at the frequencies ($f_0-\Delta f_1-\Delta f_2$) and ($f_0-\Delta f_1+\Delta f_2$) one of which is suitable to be used as a stimulated Brillouin "probe".

In order to accurately assess the total frequency shift $\Delta\Delta f_1\pm\Delta f_2|$ the system could possibly comprise at least one system to impose known strain and/or temperature conditions for the BGM (105), and/or a system to measure the said strain and/or temperature conditions, and/or a system for directly measuring the said frequency shift. For this scope the system could for example comprise (not binding) means (108, 110) for picking-up a fraction of the radiations on the output lines (112,113), obtain a beat between them i.e. through the combiner (109) detect the interference signal with at least one opto-electronic detector (111), possibly balanced differential, and analyse it to measure ($\Delta f_1+\Delta f_2$) and/or ($\Delta f_1-\Delta f_2$).

Figure 2:
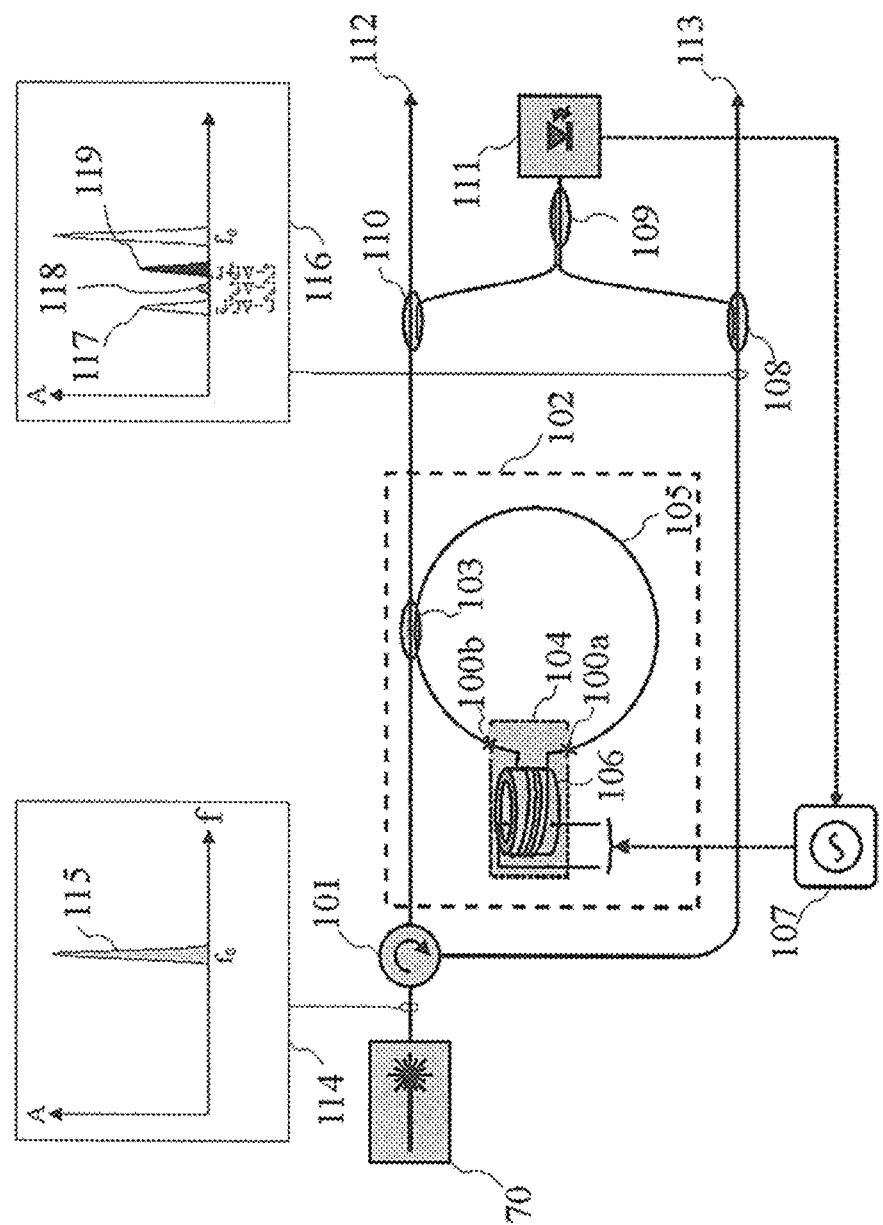
FIG. 2 illustrates a first possible embodiment of the invention in which the first conversion system of point C2) and the second conversion system of point C3) are integrated in the same ring circuit. A fraction of the radiation from a primary laser source (79) the spectrum (114) of which is constituted by a line (115) at frequency $f_0$ and linewidth suitable according to what has been already described, is injected in the cavity of a Brillouin Stokes ring laser (102) by an optical directional coupler (103), while the remaining fraction is routed to a first output line (112). The cavity (102) comprises at least one Brillouin Gain Medium (BGM, 105) characterized by a Brillouin frequency shift $\Delta f_{B,BGM}$ that satisfies the $|f_{B,SNS}-\Delta f_{B,BGM}|>N\cdot GBW_{B,SNS}$ with N>2. In particular, in case the sensing fibre is equivalent to a Corning SMF-28 having $\Delta f_{B,SNS}\approx10.84$ GHz the BGM could conveniently comprise at leas one optical fibre Corning LEAF having $\Delta f_{B,BGM}\approx10.650$ GHz (N≈7), or Pirelli "bend-insensitive" having $\Delta f_{B,BGM}\approx10.60$ GHz (N≈9), or a specialty "bend-insensitive" fibre "bend-insensitive" characterized by Mode Field Diameter (MDF) reduced at 7.8, 6.4, 5.3 o 4.2 μm having $\Delta f_{B,BGM}\approx8.5\div9.5$ GHz (N≈53). In the ring cavity (102) the counter-propagation between the injected fraction of the primary radiation, eventually in phase with the recirculating depleted primary radiation, and the back-scattered Brillouin radiation creates a Brillouin laser in which part of the Brillouin backscattering is picked-up by the same coupler (103) and selectively routed on the second output line (113) by the circulator (101). The embodiment of FIG. 2 is suitable to integrate both the first frequency conversion at $\Delta f_1$ (=$\Delta f_x$ in the drawings) of the point C2) through the conversion obtained by the Brillouin ring laser (102), and the second conversion at $\Delta f_2$ (=f in the drawings) of the point C3). This is possible when the fraction of power injected into the cavity by the coupler (103) is small (typically <2%) and the length $L_C$ of the cavity (102) is small enough to have a Free Spectral Range FSR=c/[$n_g \cdot L_C$]<~5 times the linewidth (115) and high selectivity (finesse). In these conditions the efficiency of the Brillouin laser is dependant from the matching between $L_C$ and the wavelength at the frequency of $f_0$ the primary laser strongly enough to allow the modulation of the Brillouin laser output intensity by varying $L_C$, for example (not binding) by means of a piezo-electric element (106) that, driven by an alternate electrical signal (107), stretches the fibre in part of the cavity (102). In order to avoid that the stretching could act on the BGM changing $\Delta f_1$, is convenient (but not binding) that the element (106) acts on a segment (104) of the cavity that is small and/or with no or limited BGM function, for example made out of fibre Corning SMF-28e+ having reduced Brillouin scattering or a free-space propagation in the vacuum or in a non-solid medium. The said segment (104) will be integrated in the cavity avoiding reflection at boundaries, i.e. by fused splices (100a, 100b) between the different fibres and/or anti-reflective transitions. The system described, by optimizing the value of FSR and modulation range of Le allowed to modulate at $\Delta f_2\sim200$ MHz with depth of 85-90% with a very low frequency (~400 kHz) piezo drive signal (107), having waveform typically triangular (not binding), and with a very low industrial cost.
Figure 3:
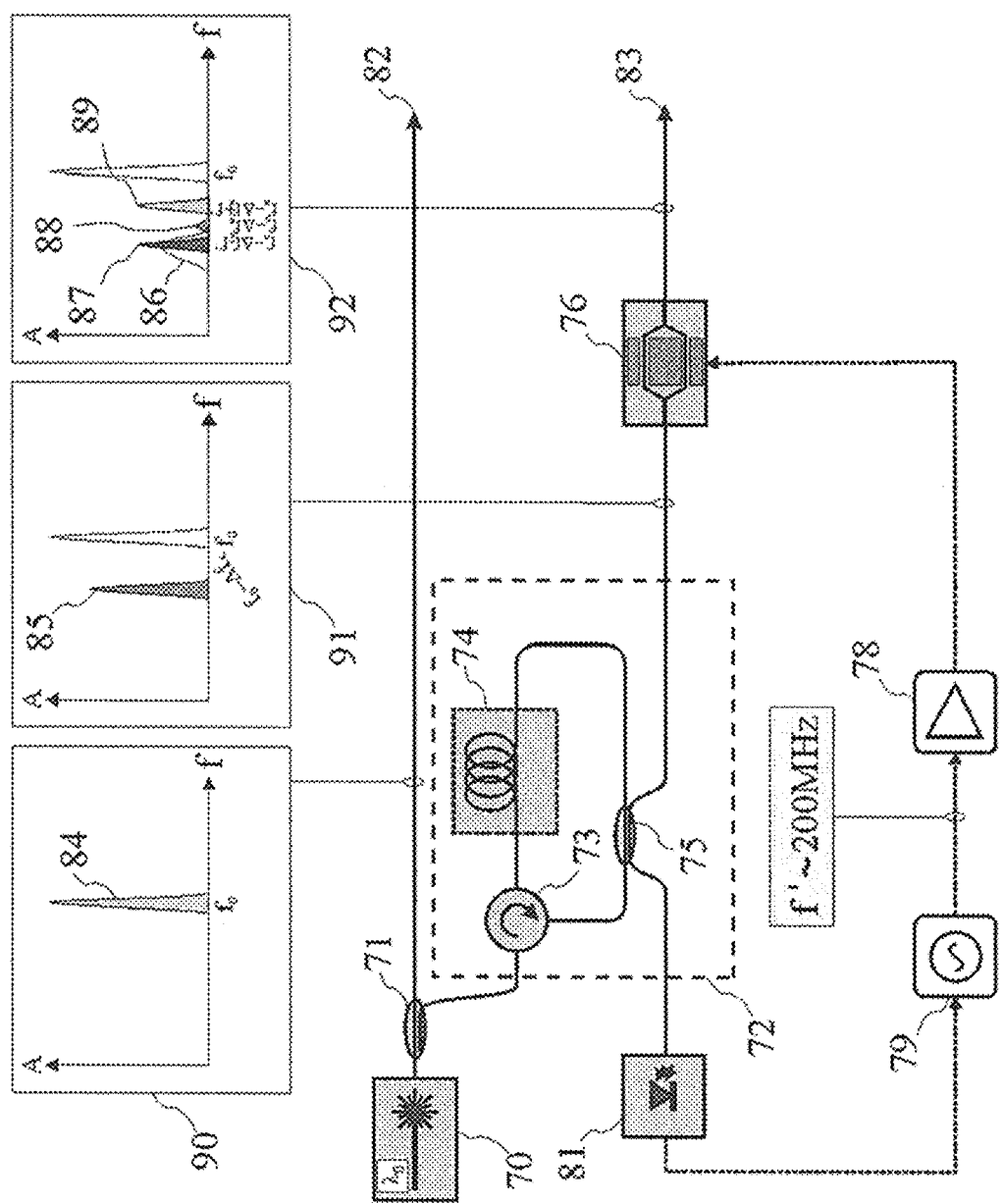

FIG. 3 illustrates a second not binding embodiment of the invention using a more efficient type of Brillouin laser as first conversion system (point C2) followed by a separate modulator as second conversion system (point C3). A fraction of the radiation from the primary laser source (70) is picked-up by a coupler (71) and injected through a directional routing mean or circulator (73) in the ring circuit (72) while the remaining fraction is routed to a first output line (82). The ring circuit (72) comprises at least one BGM (74) according to what has been already described, and loops on the same circulator (73) so that to allow the recirculation of the backscattered Brillouin radiation in counter-propagation with the fraction of the primary radiation that is injected in the ring. The circuit (72) embodies a Brillouin laser with injection efficiency (80-99%) for the primary radiation (pump) much bigger than that (1-2%) typical for the ring in FIG. 2, and that works with cavity (and BGM) lengths $l_c$ long enough to have FSR similar or lower to the spectral linewidth (84), coarse cavity finesse and low selectivity, in these conditions the internal efficiency of the ring laser (72) can raise at 50-60% and becomes independent from the wavelength of the primary source within a very wide range (even >40 nm). The ring (72) embodies a first conversion system according to the point C2) producing a radiation with spectrum (91) constituted by the Brillouin Stokes line (85) of frequency ($f_0$-$\Delta f_1$), part of which (typically <10%) is picked-up by directional coupling means (75) and routed to a first intermediate line (130). The second frequency conversion systems according to the point C3) is embodied by at least one electro-optical intensity modulator (76) driven by an electrical signal (79) of frequency $\Delta f_2$, amplified (78) if needed, to obtain on the second output line (83) a radiation the spectrum of which (92) comprises eventually a residuum (88) of the carrier at frequency ($f_0$-$\Delta f_1$) and two sidebands (87, 89) at the frequencies ($f_0$-$\Delta f_1$+$\Delta f_2$) and ($f_0$-$\Delta f_1$-$\Delta f_2$) of which one is suitable to be used as stimulated Brillouin "probe".

Similarly to what already described there could be also present means to control and/or stabilise $\Delta f_1$ (directly or indirectly) and/or to measure the shift $|\Delta f_1 \pm \Delta f_2|$ and/or $\Delta f_1$.

In particular it could be possibly present a second intermediate output line (131) from the Brillouin laser in which are mixed the depleted primary radiation and the forward Brillouin scattering (that is with the same propagation direction of the primary radiation), the beat signal of which is collected by at least one electro-optical detector (81), possibly balanced differential, and analysed to measure $\Delta f_1$.

Figure 4:
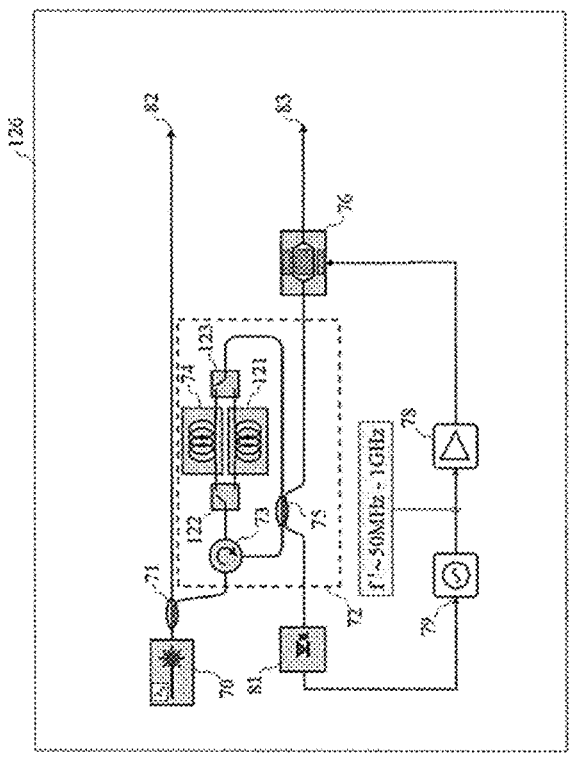
Figure 4:
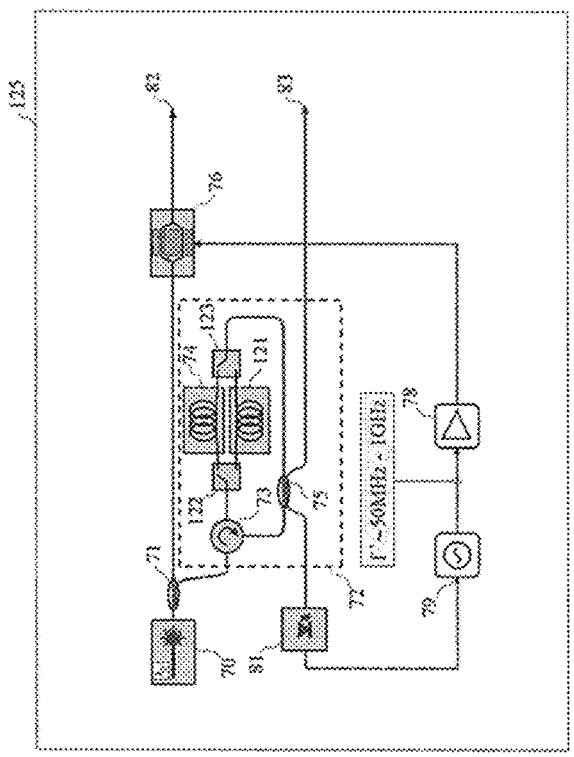

FIG. 4 illustrates further variants, not binding, of the present invention. The frame (125) illustrates a variant of FIG. 2 in which, in order to have a further extension of the frequency-shift tuning range, the shift $\Delta f_1$ of the first conversion system can be switched between at least two different values by switching means (112, 123) that include in the circuit (72) one between the different Brillouin gain media BGM-1 and BGM-2 (74, 121) having $\Delta f_{B(BGM-1)} \neq \Delta f_{B(BGM-2)}$.

For example (not binding) considering a modulation range 50 MHz<$\Delta f_2$<1 GHz, BGM-1 could have $\Delta f_{B(BGM-1)} \approx 10.650$ GHz (LEAP fibre) and BGM-2 $\Delta f_{B(BGM-2)} \approx 10.840$ GHz (SMF-28), so switching on BGM-1 it is possible to use as Brillouin "probe" the addictive modulation band that can be tuned between the minimum ($\Delta f_{B(BGM-1)}+\Delta f_{2,min}$) and the maximum (($\Delta f_{B(BGM-1)}+\Delta f_{2,max}$), while switching on BGM-2 is possible to use the subtractive modulation band that can be tuned between the minimum ($\Delta f_{B(BGM-2)}+\Delta f_{2,min}$) and the maximum $\Delta f_{B(BGM-2)}+\Delta f_{2,max}$), thus extending the tuning range of >800 MHz with respect to the case with a single BGM.

The frame (126) illustrates a variant of the frame (125) in which the second frequency conversion system is obtained though the modulator (76) on the radiation on the first output line (82) instead on that of the line (83) with the same effects of the tuning of the total frequency shift between the Brillouin "pump" and "probe" radiations, but also allowing to use the same modulator (76) to superimpose further modulations at low frequency and/or pulsed.

In any possible embodiment, the components of the apparatus can be even different from the one explicitly listed, and even connected in a different way but keeping the peculiar functionalities that have been described.

The frequency conversion system could also comprise, additionally or in substitution, one or more: optical amplifiers possibly semiconductor-based (Semiconductor Optical Amplifier, SOA) and/or "tandem" or nested modulators and/or other types of non-linear mixers such as for example four-wave mixing devices, phase modulators and/or modulation interferometers. Modifications and variants are also possible even with added components and functional blocks not illustrated or explicitly listed, such as for example (not binding) components for controlling or analysing the polarization, within the present patent.

What is claimed is:

1. An apparatus for producing and sourcing, through multiple frequency conversions, at least two optical radiations having a relative total frequency shift $\Delta f$ that is stable, known and tunable around the value of the Brillouin frequency shift $\Delta f_{B,SNS}$ in a medium acting as a sensor and having a Brillouin gain bandwidth $GBW_{B,SNS}$, so that the said radiations can be used in a Brillouin analyzer for measuring the distribution of $\Delta f_{B,SNS}$ along the length of the sensor, wherein the said apparatus comprises:
   at least one source (70) of primary radiation (84, 115) with a frequency $f_0$ and a linewidth $LW_0$ not greater than the Brillouin gain bandwidth $GBW_{B,SNS}$ in the sensor; and
   at least one first stimulated Brillouin frequency conversion system based on Brillouin scattering (72, 102) in which, by means of stimulated Brillouin scattering in a Brillouin Gain Medium BGM (74, 105) having a Brillouin gain bandwidth $GBW_{B,BGM}$ not smaller than the linewidth $LW_0$ of the source (70) of primary radiation, a fraction of the primary radiation (84) is converted into a first secondary radiation (85) having a frequency $f_0$-$\Delta f_1$ or $f_0$+$\Delta f_1$ where a frequency shift of nominal value $\Delta f_1$, which is equal to the Brillouin frequency shift $\Delta f_{B,BGM}$ of the Brillouin gain medium BGM (74, 105), is imposed to be far away from the Brillouin frequency shift $\Delta f_{B,SNS}$ of the sensor of more than twice the value of the Brillouin gain bandwidth $GBW_{B,SNS}$ of the sensor by means of choosing a Brillouin gain medium BGM (74, 105) different from the sensor medium for what concerns the doping in Germanium and/or other substances, and/or the photo-acoustic coupling; and
   at least one second frequency conversion system based on electro-optical modulation (76, 104) in which, by means of an electro-optical modulator, a fraction of the primary radiation (84) or of the first secondary radiation (85), is shifted by a frequency of nominal value $\Delta f_2$ which can be controlled arbitrarily in a range wide enough to allow a total frequency shift $\Delta f$ between the two optical radiations sourced by the apparatus, which is produced by the combination $|\Delta f_1+\Delta f_2|$ of the frequency shift $\Delta f_1$ produced by the first frequency conversion system and of the frequency shift $\Delta f_2$ produced by the second frequency conversion system, to scan the Brillouin gain band of the sensor around the value of the Brillouin frequency shift of the sensor $\Delta f_{B,SNS}$.

2. An apparatus according to claim 1, wherein the first frequency conversion system based on Brillouin scattering comprises a plurality of different switchable (122, 123) or interchangeable Brillouin gain media (74, 121) that have a Brillouin frequency shift different the one with respect to the other, in order to change or switch the nominal value $\Delta f_1$ of the frequency shift produced by the first frequency conversion system based on Brillouin scattering.

3. An apparatus according to claim 1, further comprising at least one system for measuring and/or stabilizing the temperature of the Brillouin gain medium BGM (74, 105), in order to evaluate or respectively reduce the drift of the actual frequency shift produced by the first frequency conversion system based on Brillouin scattering from its nominal value $\Delta f_1$.

4. An apparatus according to claim 1, wherein the apparatus is integrated or used in a system for measuring the distribution of the Brillouin frequency shift along the length of an optical fiber acting as a sensor according to any technique of analysis in the time-domain or BOTDA, or in the optical coherence-domain or BOCDA, or in the optical frequency-domain or I-BOFDA or C-BOFDR, or according to a different technique, or to a combination of techniques.

5. An apparatus according to claim 1, in which the first frequency conversion system based on Brillouin scattering is embodied by a Brillouin ring laser (102) having a ring cavity (105) of a resonant length $L_c$ and a linewidth $LW_{BRL}$, and in which the second frequency conversion system based on electro-optical modulation is embodied by an electro-mechanical actuator (106) acting on the resonant length $L_C$ of the ring cavity (105) of the said Brillouin ring laser (102), wherein the said ring cavity (105) fulfils the requirements for transducing the detuning action of the resonant cavity length $L_C$ into an optical modulation of depth not smaller than 80%, that is the ring cavity (105) has a free spectral range larger that the linewidth $LW_{BRL}$ of the Brillouin ring laser (102), and the ring cavity (105) has a finesse not smaller than 4.

6. An apparatus according to claim 5, wherein the electro-mechanical actuator (106) acting on the resonant length $L_C$ of the Brillouin ring laser cavity (105) acts only on a portion (104) of the same cavity that is constituted by a medium having a Brillouin gain smaller that the Brillouin gain of the Brillouin gain medium BGM (74, 105) which constitutes the rest of the cavity.

7. An apparatus according to claim 1, further comprising at least one optical heterodyne system (109, 131) and electro-optical detector means (81, 111) for generating an optical interference signal between two of the optical radiations and for transducing the same into an electrical signal having frequency $\Delta f_{fbk}$ which is equal to the actual value of the frequency shift between the primary radiation (84) and the first secondary radiation (85), the nominal value of which is $\Delta f_1$, or which is equal to the actual value total frequency shift $\Delta f$ between the two optical radiations sourced by the apparatus, the nominal value of which is $|\Delta f_1 \pm \Delta f_2|$.

8. An apparatus according to claim 7, further comprising at least one feedback stabilization system (79, 107) that:
receives the said electrical signal having the frequency $\Delta f_{fbk}$ of the actual frequency shift between two of the optical radiations; and
evaluates a frequency shift error $d\Delta f$ equal to the actual frequency difference between the value of the actual frequency shift $\Delta f_{fbk}$ and the desired nominal value $\Delta f_1$ or between the value of the actual frequency shift $\Delta f_{fbk}$ and the frequency shift between the two optical radiations $|\Delta f_1 \pm \Delta f_2|$; and
generates a drive signal for the second frequency conversion system based on electro-optical modulation (76, 104), the frequency of which drive signal is equal to the sum or to the difference between the frequency shift error $d\Delta f$ and the nominal value $\Delta f_2$ desired for the frequency shift of the said second frequency conversion system, so that to stabilize the value of $|\Delta f_1 + \Delta f_2|$ or of $|\Delta f_1 - \Delta f_2|$.

* * * * *